United States Patent
Chen

(10) Patent No.: US 12,301,485 B2
(45) Date of Patent: May 13, 2025

(54) UPLINK PRECODING METHOD, DEVICE AND SYSTEM

(71) Applicant: GUANGDONG OPPO MOBILE TELECOMMUNICATIONS CORP., LTD., Guangdong (CN)

(72) Inventor: Wenhong Chen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 718 days.

(21) Appl. No.: 17/356,264

(22) Filed: Jun. 23, 2021

(65) Prior Publication Data

US 2021/0320770 A1 Oct. 14, 2021

Related U.S. Application Data

(63) Continuation of application No. 16/616,377, filed as application No. PCT/CN2017/085981 on May 25, 2017, now Pat. No. 11,082,180.

(51) Int. Cl.
*H04W 72/21* (2023.01)
*H04L 5/00* (2006.01)
(Continued)

(52) U.S. Cl.
CPC .......... *H04L 5/0048* (2013.01); *H04L 5/0053* (2013.01); *H04W 72/1268* (2013.01); *H04W 72/21* (2023.01); *H04W 72/23* (2023.01)

(58) Field of Classification Search
CPC .... H04L 5/0048; H04L 5/0053; H04W 72/21; H04W 72/23; H04W 72/1268;
(Continued)

(56) References Cited

U.S. PATENT DOCUMENTS

| 2011/0110455 A1 | 5/2011 | Gaal |
| 2011/0255483 A1 | 10/2011 | Xu |

(Continued)

FOREIGN PATENT DOCUMENTS

| CN | 101938336 A | 1/2011 |
| CN | 102083223 A | 6/2011 |

(Continued)

OTHER PUBLICATIONS

First Office Action of the corresponding Vietnamese patent application No. 1-2019-06918, issued on Jun. 26, 2023 pages with English translation.
(Continued)

*Primary Examiner* — Bo Hui A Zhu
(74) *Attorney, Agent, or Firm* — Ladas & Parry, LLP

(57) ABSTRACT

Disclosed are an uplink precoding method, device and system. A terminal device transmits an SRS on at least one SRS resource, and receives DCI used by a network side to schedule uplink data transmission, the DCI comprising RI and/or SRI, then determines a precoding approach for the uplink data according to the RI and/or SRI and at least one SRS resource, precodes the uplink data according to the precoding approach, and transmits the precoded uplink data. By applying the solution of the present invention, signaling overhead can be reduced.

18 Claims, 2 Drawing Sheets

(51) Int. Cl.
  *H04W 72/1268* (2023.01)
  *H04W 72/23* (2023.01)
(58) Field of Classification Search
  CPC . H04W 72/02; H04W 72/04; H04W 72/0446; H04W 72/121; H04W 72/50; H04W 72/51; H04W 72/52; H04W 72/53; H04W 72/54; H04W 72/541; H04W 72/542; H04W 72/543; H04W 72/56
  See application file for complete search history.

(56) References Cited

U.S. PATENT DOCUMENTS

| | | |
|---|---|---|
| 2011/0299484 A1 | 12/2011 | Nam |
| 2016/0156397 A1 | 6/2016 | Onggosanusi et al. |
| 2018/0227035 A1 | 8/2018 | Cheng |
| 2019/0132851 A1 | 5/2019 | Davydov et al. |
| 2019/0199553 A1 | 6/2019 | Park et al. |
| 2019/0207731 A1* | 7/2019 | Park ................... H04B 7/0456 |
| 2019/0222277 A1 | 7/2019 | Park et al. |
| 2020/0083939 A1 | 3/2020 | Park et al. |

FOREIGN PATENT DOCUMENTS

| | | |
|---|---|---|
| CN | 102263620 A | 11/2011 |
| CN | 102934381 A | 2/2013 |
| CN | 104469947 A | 3/2015 |
| CN | 102740477 B | 3/2016 |
| CN | 106209195 A | 12/2016 |
| CN | 107113040 A | 8/2017 |
| RU | 2590910 C1 | 7/2016 |
| RU | 2717840 C1 | 3/2020 |
| WO | 2011106996 A1 | 9/2011 |
| WO | 2018056789 A1 | 3/2018 |

OTHER PUBLICATIONS

First Office Action and search report of the corresponding Chinese patent application No. 201780090769.9, issued on Aug. 29, 2023 with English translation.
First Office Action of the European application No. 21166011.3, issued on Feb. 9, 2023.
International Search Report in the international application No. PCT/CN2017/085981, mailed on Jan. 26, 2018.
Written Opinion of the International Search Authority in the international application No. PCT/CN2017/085981, mailed on Jan. 26, 2018.
Samsung: "Discussion on Non-Codebook-Based UL Transmission", 3GPP Draft; R1-1707945 NR UL Non-CB-Based TX, 3rd Generation Partnership Project (3GPP), Mobile Competence Centre; 650, Route des Lucioles; F-06921 Sophia-Antipolis Cedex; France, vol. RAN WG1, No. Hangzhou, China; May 15, 2017-May 19, 2017 May 14, 2017 (May 14, 2017), XP051273143, entire document.
Ericsson: "UL MIMO procedures for non-codebook based transmission", 3GPP Draft; R1-1708670, 3rd Generation Partnership Project (3GPP), Mobile Competence Centre; 650, Route des Lucioles ; F-06921 Sophia-Antipolis Cedex; France, vol. RAN WG1, No. Hangzhou, China; May 15, 2017-May 19, 2017 May 14, 2017 (May 14, 2017), XP051273853, entire document.
Supplementary European Search Report in the European application No. 17910662.0, mailed on Mar. 19, 2020.
First Office Action of the Russian application No. 2019141835, issued on May 26, 2020.
Ericsson, "UL MIMO procedures for non-codebook based transmission", 3GPP TSG-RAN WG1 #88bis R1-1705886 Spokane, WA, USA, Mar. 3-7, 2017, entire document.
First Office Action of the Chilean application No. 201903411, issued on Nov. 19, 2020.
First Office Action of the Canadian application No. 3063782, issued on Dec. 15, 2020.
First Office Action of the Chinese application No. 201911314055.9, issued on Nov. 2, 2020.
Office Action of the Indian application No. 201917051260, issued on May 11, 2021.
First Office Action of the Japanese application No. 2019-563761, issued on May 21, 2021.
Written Opinion of the Singaporean application No. 11201910831U, issued on Apr. 22, 2021.
First Office Action of the Korean application No. 10-2019-7034974, issued on Jun. 15, 2021.
First Office Action of the U.S. Appl. No. 16/616,377, issued on Feb. 24, 2021.
Notice of Allowance of the U.S. Appl. No. 16/616,377, issued on Mar. 25, 2021.
International Preliminary Report on Patentability Chapter I in International Application No. PCT/CN2017/085981, issued on Nov. 26, 2019.
European Search Report in the European application No. 21166011. 3, malled on Jul. 20, 2021.
Second Office Action of the Chilean application No. 201903411, issued on Jul. 23, 2021.
First Office Action of the Indonesian application No. P00201912312, issued on May 27, 2022.
First Office Action of the Israeli application No. 270659, issued on Feb. 1, 2022.
Third Office Action of the Chilean application No. 201903411, issued on Mar. 17, 2022.
First Office Action of the Australian application No. 2017415185, issued on Mar. 26, 2022.
First Office Action of the Taiwanese application No. 107114991, issued on Sep. 30, 2021.
First Office Action of the corresponding Brazilian application No. BR1120190242511, issued on Jan. 23, 2024, 10 pages with English translation.

* cited by examiner

UPLINK PRECODING METHOD, DEVICE AND SYSTEM

CROSS-REFERENCE TO RELATED APPLICATIONS

This application is a continuation of U.S. application Ser. No. 16/616,377 filed on Nov. 22, 2019, which is a national stage of International Application No. PCT/CN2017/085981 filed on May 25, 2017, the disclosures of which are hereby incorporated by reference in their entireties.

TECHNICAL FIELD

The disclosure relates to a wireless network technology, and more particularly to an uplink pre-coding method, a device and a system.

BACKGROUND

A terminal device, before sending uplink data, needs to perform pre-coding processing on the uplink data to obtain an uplink pre-coding gain.

Pre-coding processing is usually classified into two parts: analogue domain processing and digital domain processing. Analogue domain processing is directed to an analogue signal, and a radio frequency signal is usually mapped to a physical antenna in a beamforming manner. Digital domain processing is directed to a digital signal, and is usually implemented in baseband. The digital signal is pre-coded with a pre-coding matrix, and data at a transmission layer is mapped to a radio frequency port.

Due to the limited number of radio frequency channels of a terminal device, two processing manners are usually adopted at the same time, namely the digital signal is pre-coded and the analogue signal is beamformed.

In a codebook-based uplink pre-coding scheme, the terminal device may send sounding reference signals (SRSs) on multiple SRS resources. Here, the SRS on each SRS resource uses a different beam. The network side selects the best SRS resource to obtain uplink channel state information (CSI) and indicates a resource index to the terminal device through an SRS resource indication (SRI), such that the terminal device may perform analogue beamforming on uplink data by use of the beam corresponding to the SRS resource. Meanwhile, the network side may indicate a rank indication (RI) and a pre-coding matrix indication (PMI) through downlink control information (DCI), and the terminal device may determine an uplink pre-coding matrix corresponding to the PMI from a codebook according to the RI and the PMI.

It can be seen that, according to the existing processing manner, it is necessary for the DCI to include various information such as an RI, a PMI and an SRI, so that a relatively high signaling overhead is required.

SUMMARY

In view of this, the disclosure provides an uplink pre-coding method, a device and a system, which can reduce a signaling overhead.

The following technical solutions are adopted.

An uplink pre-coding method may include the following operations.

A terminal device transmits an SRS on at least one SRS resource.

The terminal device receives DCI for scheduling uplink data transmission from a network side. The DCI includes an RI and/or an SRI.

The terminal device determines a pre-coding scheme for uplink data according to at least one SRS resource and at least one of the RI or the SRI.

The terminal device pre-codes the uplink data according to the pre-coding scheme, and sends the pre-coded uplink data.

An uplink pre-coding method may include the following operations.

A network-side device acquires an SRS transmitted by a terminal device on at least one SRS resource.

The network-side device sends DCI for scheduling uplink data transmission to the terminal device. The DCI includes an RI and/or an SRI, and is used for the terminal device to determine a pre-coding scheme for uplink data according to the at least one SRS resource and at least one of the RI or the SRI, and pre-code the uplink data according to the pre-coding scheme.

The network-side device receives the pre-coded uplink data sent by the terminal device.

A terminal device may include an information processing unit, a pre-coding scheme determination unit and an uplink data processing unit.

The information processing unit may be configured to transmit an SRS on at least one SRS resource and receive DCI for scheduling uplink data transmission from a network side. The DCI includes an RI and/or an SRI.

The pre-coding scheme determination unit may be configured to determine a pre-coding scheme for uplink data according to at least one SRS resource and at least one of the RI or the SRI.

The uplink data processing unit may be configured to pre-code the uplink data according to the pre-coding scheme and send the pre-coded uplink data.

A network-side device may include a first processing unit and a second processing unit.

The first processing unit may be configured to acquire an SRS transmitted by a terminal device on at least one SRS resource and send DCI for scheduling uplink data transmission to the terminal device. The DCI includes an RI and/or an SRI, and is used for the terminal device to determine a pre-coding scheme for uplink data according to the at least one SRS resource and at least one of the RI or the SRI, and pre-code the uplink data according to the pre-coding scheme.

The second processing unit may be configured to receive the pre-coded uplink data from the terminal device.

An uplink pre-coding system may include the abovementioned terminal device and the abovementioned network-side device.

Based on the above introductions, it can be seen that, with adoption of the solutions of the disclosure, the DCI sent to the terminal device by the network side merely needs to include one or two of the RI and the SRI, and then the terminal device may determine the pre-coding scheme for the uplink data according to the RRI and/or the SRI, etc., and further pre-code and send the uplink data. Therefore, compared with the prior art, the solutions have an advantage that a signaling overhead of the DCI is reduced.

DETAILED DESCRIPTION

For making the technical solutions of the disclosure clearer, the solutions of the disclosure will further be described below with reference to the drawings and embodiments.

It is apparent that the described embodiments are not all embodiments but part of embodiments of the disclosure. All other embodiments obtained by those skilled in the art on the basis of the embodiments in the disclosure without creative work shall fall within the scope of protection of the disclosure.

Figure 1:
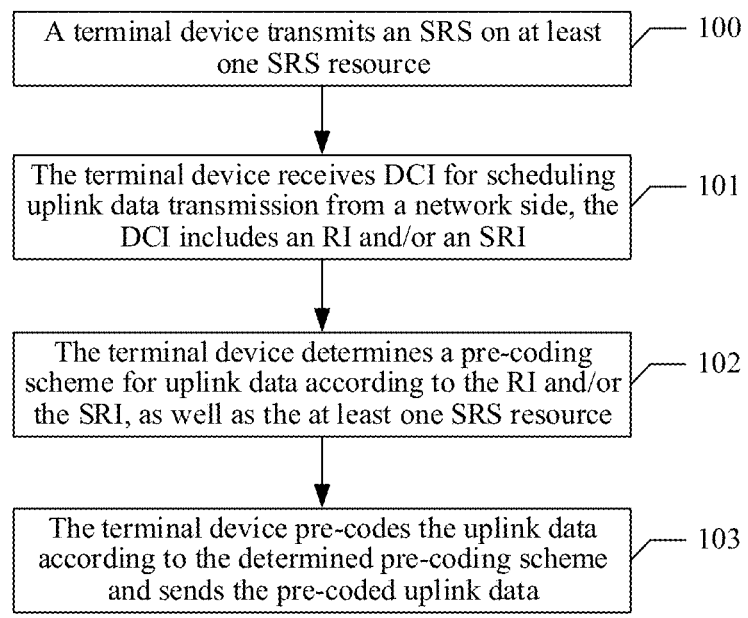
FIG. 1 illustrates a flowchart of an uplink pre-coding method according to an embodiment of the disclosure.

FIG. 1 is a flowchart of an uplink pre-coding method embodiment according to the disclosure. As shown in FIG. 1, the following implementation modes are included.

In 100, a terminal device transmits an SRS on at least one SRS resource.

The at least one SRS resource refers to that the number of SRS resources may be 1 and may also be more than 1.

A single antenna port is adopted for each of the at least one SRS resource.

Or, N antenna ports are adopted for each of the at least one SRS resource.

Or, the at least one SRS resource comprises K SRS resources, and k antenna ports are adopted for the $k^{th}$ SRS resource of the K SRS resources.

N is a number of ports for uplink data transmission, $1 \leq k \leq K$, $K \leq N$.

If a value of K is 4, one antenna port may be adopted for the first SRS resource, two antenna ports may be adopted for the second SRS resource, three antenna ports may be adopted for the third SRS resource and four antenna ports may be adopted for the fourth SRS resource.

In a practical application, the terminal device may determine a beam for transmitting the SRS according to downlink channel information obtained from a downlink signal. For example, the terminal device may determine the beam for transmitting the SRS according to a receiving beam receiving the downlink signal.

The beam is a beam for analogue beamforming, and is invisible for the network side.

The downlink signal may be indicated to the terminal device through a PMI domain in DCI.

In addition, the downlink signal may be a downlink reference signal or a downlink synchronization signal.

In 101, the terminal device receives DCI for scheduling uplink data transmission from a network side. The DCI includes an RI and/or an SRI.

The DCI does not include information for indicating a pre-coding matrix for uplink data.

The DCI may not include a PMI information domain. Or, the DCI may include the PMI information domain, but the PMI information domain is not used to indicate the pre-coding matrix but to indicate other information, for example, an antenna port.

The DCI includes at least one of the RI or the SRI, namely the DCI may include the RI or the SRI only, or may include both the RI and the SRI. A content thereof may be configured by the network side.

In 102, the terminal device determines a pre-coding scheme for uplink data according to the RI and/or the SRI, as well as the at least one SRS resource.

The pre-coding scheme includes at least one of: a beam for analogue domain beamforming, or a pre-coding matrix for digital domain pre-coding. The terminal device may also combine analogue beamforming and digital pre-coding to obtain a joint pre-coding matrix as the pre-coding scheme for the uplink data.

In the embodiment, five preferred implementation manners are provided for how the terminal device determines the pre-coding scheme for the uplink data, and will be introduced below respectively.

1) A First Manner

The terminal device may determine one or more target SRS resources from the at least one SRS resource according to the RI and the SRI, and further determine the pre-coding scheme for the uplink data according to a pre-coding scheme for the target SRS resources.

The terminal device may firstly determine the number of the target SRS resources according to the RI, and then may determine the target SRS resources according to the number of the target SRS resources and the SRI.

For a different number of the target SRS resources, a correspondence relationship between SRIs and target SRS resources is also different.

If the at least one SRS resource includes four SRS resources, corresponding to different rank values indicated by the RI (2 bits), a correspondence relationship between SRIs and SRS resources may be shown in Table 1, the rank value is equal to the number of the target SRS resources.

TABLE 1

Correspondence Relationship between SRIs and SRS Resources

| SRI value | Index of the target SRS resources | | | |
|---|---|---|---|---|
| (3 bits) | Rank = 1 | Rank = 2 | Rank = 3 | Rank = 4 |
| 0 | 0 | {0, 1} | {0, 1, 2,} | {0, 1, 2, 3} |
| 1 | 1 | {0, 2} | {0, 1, 3} | — |
| 2 | 2 | {0, 3} | {0, 2, 3} | — |
| 3 | 3 | {1, 2} | {1, 2, 3} | — |
| 4 | — | {1, 3} | — | — |
| 5 | — | {2, 3} | — | — |
| 6 | — | — | — | — |
| 7 | — | — | — | — |

In this manner, a single antenna port is adopted for each of the at least one SRS resource.

Each target SRS resource corresponds to an uplink transmission layer, and when the terminal device determines the pre-coding scheme for the uplink data, a beam and pre-coding matrix for each target SRS resource may be determined as a beam and pre-coding matrix for transmission of a transmission layer.

2) A Second Manner

The terminal device may determine a transmission layer number according to the RI, determine the pre-coding matrix for the uplink data according to the transmission layer number and uplink channel information, determine the target SRS resource from the at least one SRS resource according to the SRI, determine a beam for the uplink data according to a beam for the target SRS resource and obtain the pre-coding scheme for the uplink data according to the determined pre-coding matrix and beam.

In this manner, there is no fixed sequence for processes of determining the beam and determining the pre-coding matrix.

The terminal device may obtain the uplink channel information according to the downlink channel information obtained based on the downlink signal.

The downlink signal may be indicated to the terminal device through the PMI domain in the DCI.

In addition, the downlink signal may be a downlink reference signal or a downlink synchronization signal.

The terminal device, after determining the transmission layer number according to the RI, may determine the pre-coding matrix for the uplink data based on the transmission layer number and the uplink channel information. For example, first R feature vectors in an uplink channel related matrix or covariance matrix in the uplink channel information may be determined as the pre-coding matrix for the uplink data, where R represents the transmission layer number.

In this manner, N antenna ports are adopted for each of the at least one SRS resource, where N is a number of ports for uplink data transmission.

In addition, in this manner, the number of the target SRS resource is usually 1, the SRI may contain an index of the target SRS resource, and after the target SRS resource is determined, the beam for the target SRS resource may be determined as the beam for the uplink data.

It can be seen that, in this manner, the pre-coding matrix for the uplink data is determined through the RI and the uplink channel information, and the beam for the uplink data is determined through the SRI, thereby obtaining the pre-coding matrix for the uplink data.

3) A Third Manner

The terminal device may determine the transmission layer number according to the RI, determine the pre-coding matrix for the uplink data according to the transmission layer number and the uplink channel information, determine the beam for the uplink data according to a beam for the at least one SRS resource, and obtain the pre-coding scheme for the uplink data according to the determined pre-coding matrix and beam.

In this manner, the DCI with the RI does not include indication information of the SRS resource. The DCI may not include an SRI information domain. Or, the DCI may include the SRI information domain, but the SRI information domain is not used to indicate the SRS resource, but to indicate other information, for example, an antenna port.

The terminal device may obtain the uplink channel information according to the downlink channel information obtained based on the downlink signal.

The downlink signal may be indicated to the terminal device through the PMI domain in the DCI.

In addition, the downlink signal may be a downlink reference signal or a downlink synchronization signal.

The terminal device, after determining the transmission layer number according to the RI, may determine the pre-coding matrix for the uplink data based on the transmission layer number and the uplink channel information. For example, the first R feature vectors in the uplink channel related matrix or covariance matrix in the uplink channel information may be determined as the pre-coding matrix for the uplink data, where R represents the transmission layer number.

In this manner, N antenna ports are adopted for each of the at least one SRS resource, where N is a number of ports for uplink data transmission.

In addition, in this manner, the at least one SRS resource includes one SRS resource, and the beam for transmitting the SRS on the SRS resource may be determined according to the downlink channel information obtained from the downlink signal. For example, the terminal device may determine the sending beam for transmitting the SRS according to the receiving beam for receiving the downlink signal.

The terminal device, when determining the pre-coding scheme for the uplink data, may determine the beam for the at least one SRS resource as the beam for the uplink data, and determine the pre-coding matrix determined according to the RI and the uplink channel information as the pre-coding matrix for the uplink data.

4) A Fourth Manner

The terminal device may determine one or more target SRS resources from the at least one SRS resource according to the SRI and determine a pre-coding scheme for the target SRS resource as the pre-coding scheme for the uplink data.

In this manner, the DCI with the SRI does not include indication information of the transmission layer number. The DCI may not include the RI information domain. Or, the DCI may include the RI information domain, but the RI information domain is not used to indicate the transmission layer number but to indicate other information, for example, the antenna port.

The terminal device may determine the transmission layer number according to the number of ports for the target SRS resources or the number of the target SRS resources. If a single antenna port is adopted for each of the at least one SRS resource, the terminal device may determine the transmission layer number according to the number of the target SRS resources. If the at least one SRS resource includes K SRS resources and k antenna ports are adopted for the $k^{th}$ SRS resource, the terminal device may determine the transmission layer number according to the port number for the target SRS resources.

For example, if a single antenna port is adopted for each of the at least one SRS resource, the SRI may indicate the target SRS resources in the at least one SRS resource in a bitmap manner, the number of the target SRS resources is the transmission layer number, each target SRS resource corresponds to an uplink transmission layer, and the beam and pre-coding matrix for each target SRS resource may be determined as the beam and pre-coding matrix for transmission of a transmission layer respectively.

For another example, if the at least one SRS resource includes K SRS resources and k antenna ports are adopted for the $k^{th}$ SRS resource, where N is a number of ports for uplink data transmission and $1 \leq k \leq K$, $K \leq N$, the SRI may indicate an index of an SRS resource in the K SRS resources as the target SRS resource, the port number for the target SRS resource is the transmission layer number. The network side simultaneously indicates the transmission layer number and the pre-coding scheme in a process of indicating the SRS resource. In such a manner, each target SRS resource corresponds to an uplink transmission layer number. The terminal device adopts beams and pre-coding matrixes for the target SRS resources at the k ports as beams and pre-coding matrixes for transmission of k transmission layers respectively.

5) A Fifth Manner

The terminal device determines the target SRS resource from the at least one SRS resource according to the RI, and determines the pre-coding scheme for the uplink data according to the pre-coding scheme for the target SRS resource.

In this manner, the DCI with the RI does not include the indication information of the SRS resource. The DCI may not include the SRI information domain. Or, the DCI may include the SRI information domain, but the SRI information domain is not used to indicate the SRS resource but to indicate other information, for example, the antenna port.

In addition, in this manner, the at least one SRS resource includes K SRS resources, and k antenna ports are adopted for the $k^{th}$ SRS resource, where N is a number of ports for uplink data transmission and $1 \le k \le K$, $K \le N$.

In this manner, the number of the target SRS resource is 1, the port number for the target SRS resource is the transmission layer number, and the RI is used for indicating both the transmission layer number and the target SRS resource. For example, if there are k ports for the $k^{th}$ SRS resource, the RI indicates that the transmission layer number is k, and also indicates that the $k^{th}$ SRS resource is the target SRS resource. Each target SRS resource corresponds to an uplink transmission layer number. The terminal device adopts the beams and pre-coding matrixes for the target SRS resources at the k ports as the beams and pre-coding matrixes for transmission of k transmission layers respectively.

The five manners for determining the pre-coding scheme for the uplink data are introduced above. In practical application, the manner to be used may be selected according to a practical condition.

For example, the terminal device may determine the manner to be adopted according to indication information of the pre-coding scheme acquired from the network side or the port number for the at least one SRS resource.

The network side may send the indication information of the pre-coding scheme through high-layer signaling and the like. Correspondingly, the terminal device may determine the pre-coding scheme for the uplink data in an indicated manner.

Or, the manner may also be determined according to the port number for the at least one SRS resource. For example, if a single antenna port is adopted for each of the at least one SRS resource, and the DCI includes the RI and the SRI, the terminal device may determine the pre-coding scheme for the uplink data in the first manner.

In 103, the terminal device pre-codes the uplink data according to the determined pre-coding scheme, and sends the pre-coded uplink data.

After the pre-coding scheme is determined, the terminal device may pre-code the uplink data by using a known approach and send the pre-coded uplink data.

The solutions of the disclosure are described in the method embodiment shown in FIG. 1 mainly from a terminal device side. For a network-side device, the network-side device may acquire the SRS transmitted by the terminal device on the at least one SRS resource, and send the DCI for scheduling uplink data transmission to the terminal device. The DCI includes at least one of the RI or the SRI, and is used for the terminal device to determine the pre-coding scheme for the uplink data according to the at least one SRS resource and at least one of the RI or the SRI, and pre-code the uplink data according to the determined pre-coding scheme. Correspondingly, the network-side device receives the pre-coded uplink data from the terminal device.

The pre-coding scheme includes the beam for analogue domain beamforming and/or the pre-coding matrix for digital domain pre-coding. The terminal device may also combine analogue beamforming and digital pre-coding to obtain the joint pre-coding matrix as the pre-coding scheme for the uplink data.

The DCI sent by the network-side device does not include the information for indicating the pre-coding matrix for the uplink data, and the terminal device may determine the pre-coding scheme for the uplink data according to the RI and/or SRI in the DCI, the at least one SRS resource, channel reciprocity and the like.

A single antenna port is adopted for each of the at least one SRS resource.

Or, N antenna ports are adopted for each of the at least one SRS resource.

Or, the at least one SRS resource includes K SRS resources, and k antenna ports are adopted for the $k^{th}$ SRS resource.

N is the port number for uplink data transmission, $1 \le k \le K$, $K \le N$.

The beam for transmitting the SRS may be determined by the terminal device according to the downlink channel information obtained from the downlink signal.

A working mode of the network-side device may refer to corresponding descriptions in the embodiment shown in FIG. 1 and will not be elaborated.

The above is the introduction about the method embodiment, and the solutions of the disclosure will further be described below through a device embodiment.

Figure 2:
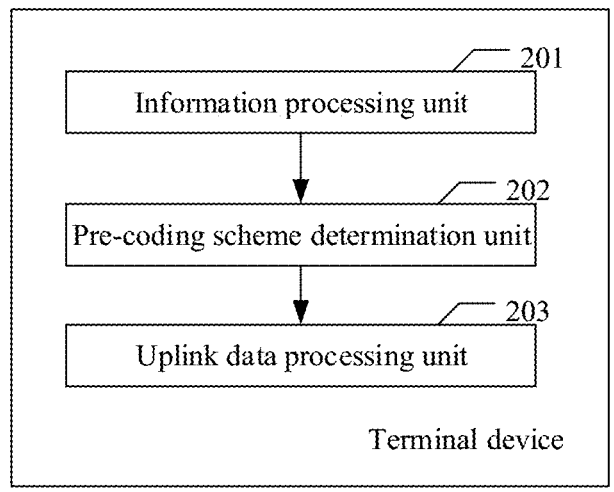
FIG. 2 illustrates a block diagram of a terminal device according to an embodiment of the disclosure.

FIG. 2 is a block diagram of a terminal device embodiment according to the disclosure. As shown in FIG. 2, a terminal device includes an information processing unit 201, a pre-coding scheme determination unit 202 and an uplink data processing unit 203.

The information processing unit 201 is configured to transmit an SRS on at least one SRS resource, and receive DCI for scheduling uplink data transmission from a network side. The DCI includes an RI and/or an SRI.

The pre-coding scheme determination unit 202 is configured to determine a pre-coding scheme for uplink data according to the RI and/or the SRI, as well as the at least one SRS resource.

The uplink data processing unit 203 is configured to pre-code the uplink data according to the pre-coding scheme and send the pre-coded uplink data.

The pre-coding scheme includes at least one of: a beam for analogue domain beamforming, or a pre-coding matrix for digital domain pre-coding. The terminal device may also combine analogue beamforming and digital pre-coding to obtain a joint pre-coding matrix as the pre-coding scheme for the uplink data.

The DCI does not include information for indicating the pre-coding matrix for the uplink data. The DCI may not include a PMI information domain. Or, the DCI may include the PMI information domain, but the PMI information domain is not used to indicate the pre-coding matrix but to indicate other information, for example, an antenna port.

The DCI includes at least one of the RI or the SRI, namely the DCI may include the RI or the SRI only, or may include both the RI and the SRI. A content thereof may be configured by the network side.

A single antenna port is adopted for each of the at least one SRS resource.

Or, N antenna ports are adopted for each of the at least one SRS resource.

Or, the at least one SRS resource includes K SRS resources, and k antenna ports are adopted for the $k^{th}$ SRS resource.

N is the port number for uplink data transmission, $1 \le k \le K$, $K \le N$.

In addition, the information processing unit 201 may determine a beam for transmitting the SRS according to downlink channel information obtained from a downlink signal.

The pre-coding scheme determination unit 202 may determine the pre-coding scheme for the uplink data in the following five manners.

1) A First Manner

The pre-coding scheme determination unit 202 may determine one or more target SRS resources from the at least one SRS resource according to the RI and the SRI, and determine the pre-coding scheme for the uplink data according to a pre-coding scheme for the target SRS resources.

The pre-coding scheme determination unit 202 may determine the number of the target SRS resources according to the RI, and further determine the target SRS resources according to the number of the target SRS resources and the SRI.

In case of different numbers of the target SRS resource, a correspondence relationship between an SRI and a target SRS resource is also different.

If the at least one SRS resource includes four SRS resources, corresponding to different rank values indicated by the RI (2 bits), a correspondence relationship between an SRI and an SRS resource may be shown in Table 1.

In this manner, a single antenna port is adopted for each of the at least one SRS resource.

Each target SRS resource corresponds to an uplink transmission layer, and when the pre-coding scheme determination unit 202 determines the pre-coding scheme for the uplink data, a beam and pre-coding matrix for each target SRS resource may be determined as a beam and pre-coding matrix for transmission of a transmission layer respectively.

2) A Second Manner

The pre-coding scheme determination unit 202 may determine a transmission layer number according to the RI, determine the pre-coding matrix for the uplink data according to the transmission layer number and uplink channel information, determine the target SRS resource from the at least one SRS resource according to the SRI, determine a beam for the uplink data according to a beam for the target SRS resource, and obtain the pre-coding scheme for the uplink data according to the determined pre-coding matrix and beam.

The pre-coding scheme determination unit 202 may obtain the uplink channel information according to the downlink channel information obtained based on the downlink signal.

The downlink signal may be indicated to the terminal device through a PMI domain in the DCI.

In addition, the downlink signal may be a downlink reference signal or a downlink synchronization signal.

The pre-coding scheme determination unit 202, after determining the transmission layer number according to the RI, may determine the pre-coding matrix for the uplink data based on the transmission layer number and the uplink channel information. For example, first R feature vectors in an uplink channel related matrix or covariance matrix in the uplink channel information may be determined as the pre-coding matrix for the uplink data, where R represents the transmission layer number.

In this manner, N antenna ports are adopted for each of the at least one SRS resource, where N is a number of ports for uplink data transmission.

3) A Third Manner

The pre-coding scheme determination unit 202 may determine the transmission layer number according to the RI, determine the pre-coding matrix for the uplink data according to the transmission layer number and the uplink channel information, determine the beam for the uplink data according to a beam for the at least one SRS resource, and obtain the pre-coding scheme for the uplink data according to the determined pre-coding matrix and beam.

In this manner, the DCI with the RI does not include indication information of the SRS resource.

The pre-coding scheme determination unit 202 may obtain the uplink channel information according to the downlink channel information obtained based on the downlink signal.

The downlink signal may be indicated to the terminal device through the PMI domain in the DCI.

In addition, the downlink signal may be a downlink reference signal or a downlink synchronization signal.

In addition, in this manner, N antenna ports are adopted for each of the at least one SRS resource, where N is a number of ports for uplink data transmission.

The at least one SRS resource includes one SRS resource.

The pre-coding scheme determination unit 202, when determining the pre-coding scheme for the uplink data, may determine the beam for the at least one SRS resource as the beam for the uplink data, and determine the pre-coding matrix determined according to the RI and the uplink channel information as the pre-coding matrix for the uplink data.

4) A Fourth Manner

The pre-coding scheme determination unit 202 may determine the target SRS resource from the at least one SRS resource according to the SRI and determine the pre-coding scheme for the uplink data according to the pre-coding scheme for the target SRS resource.

In this manner, the DCI with the SRI does not include indication information of the transmission layer number.

The pre-coding scheme determination unit 202 may determine the transmission layer number according to a number of ports for the target SRS resource or the number of the target SRS resources.

For example, if a single antenna port is adopted for each of the at least one SRS resource, the SRI may indicate the target SRS resources in the at least one SRS resource in a bitmap manner, the number of the target SRS resources is the transmission layer number, each target SRS resource corresponds to an uplink transmission layer, and a beam and pre-coding matrix for each target SRS resource may be determined as a beam and pre-coding matrix for transmission of a transmission layer respectively.

For another example, if the at least one SRS resource includes K SRS resources and k antenna ports are adopted for the $k^{th}$ SRS resource, where N is a number of ports for uplink data transmission and $1 \leq k \leq L$, $K \leq N$, the SRI may indicate an index of an SRS resource in the K SRS resources as the target SRS resource, the port number for the target SRS resources is the transmission layer number. The network side simultaneously indicates the transmission layer number and the pre-coding scheme in a process of indicating the SRS resource. In such a manner, each target SRS resource corresponds to an uplink transmission layer number. Beams and pre-coding matrixes for the target SRS resource at the k ports may be adopted as beams and pre-coding matrixes for transmission of k transmission layers respectively.

5) A Fifth Manner

The pre-coding scheme determination unit 202 may determine the target SRS resource from the at least one SRS resource according to the RI and determine the pre-coding scheme for the uplink data according to the pre-coding scheme for the target SRS resource.

In this manner, the DCI with the RI does not include the indication information of the SRS resource.

The at least one SRS resource includes K SRS resources and k antenna ports are adopted for the $k^{th}$ SRS resource, where N is a number of ports for uplink data transmission and 1≤k≤K, K≤N.

In this manner, the number of the target SRS resource is 1, the port number for the target SRS resource is the transmission layer number, the RI is used for indicating both the transmission layer number and the target SRS resource, each target SRS resource corresponds to an uplink transmission layer number, and the beams and pre-coding matrixes for the target SRS resources at the k ports may be adopted as the beams and pre-coding matrixes for transmission of k transmission layers respectively.

The pre-coding scheme determination unit 202 may determine the manner for determining the pre-coding scheme for the uplink data according to the indication information of the pre-coding scheme acquired from the network side or the port number for the at least one SRS resource.

Figure 3:
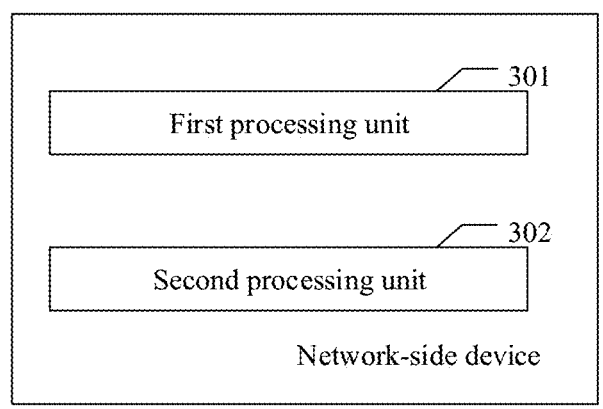
FIG. 3 illustrates a block diagram of a network-side device according to an embodiment of the disclosure.

FIG. 3 is a block diagram of a network-side device embodiment according to the disclosure. As shown in FIG. 3, a network-side device includes a first processing unit 301 and a second processing unit 302.

The first processing unit 301 is configured to acquire an SRS transmitted by a terminal device on at least one SRS resource and send DCI for scheduling uplink data transmission to the terminal device. The DCI includes an RI and/or an SRI, and is used for the terminal device to determine a pre-coding scheme for uplink data according to the at least one SRS resource and at least one of the RI or the SRI and pre-code the uplink data according to the pre-coding scheme.

The second processing unit 302 is configured to receive the pre-coded uplink data sent by the terminal device.

The pre-coding scheme includes at least one of: a beam for analogue domain beamforming, or a pre-coding matrix for digital domain pre-coding. The terminal device may also combine analogue beamforming and digital pre-coding to obtain a joint pre-coding matrix as the pre-coding scheme for the uplink data.

The DCI does not include information for indicating the pre-coding matrix for the uplink data, and the terminal device may determine the pre-coding scheme for the uplink data according to the RI and/or SRI in the DCI, the at least one SRS resource, channel reciprocity and the like.

A single antenna port is adopted for each of the at least one SRS resource.

Or, N antenna ports are adopted for each of the at least one SRS resource.

Or, the at least one SRS resource comprises K SRS resources, and k antenna ports are adopted for the $k^{th}$ SRS resource of the K SRS resources.

N is a number of ports for uplink data transmission, 1≤k≤K, K≤N.

In addition, a beam for transmitting the SRS may be determined by the terminal device according to downlink channel information obtained from a downlink signal.

The disclosure also discloses an uplink pre-coding system, which includes the terminal device shown in FIG. 2 and the network-side device shown in FIG. 3.

Each embodiment in the abovementioned embodiments is described with different emphases, and undetailed parts in a certain embodiment may refer to related descriptions in the other embodiments.

In short, with adoption of the solutions in each embodiment, the terminal device may determine the pre-coding scheme for the uplink data based on RI and/or SRI information of the network side, the at least one SRS resource, the channel reciprocity and the like, so that not only is the signaling overhead of the DCI reduced, but also an uplink pre-coding gain may be increased.

In some embodiments provided by the disclosure, it is to be understood that the disclosed device and method and the like may be implemented in another manner. For example, the above-described device embodiment is only schematic. For example, division of the units is only logical function division, and other division manners may be adopted during practical implementation.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit. The integrated unit may be implemented in a hardware form and may also be implemented in form of hardware and software functional unit.

The integrated unit implemented in form of software functional unit may be stored in a computer-readable storage medium. The software functional unit is stored in a storage medium, including a plurality of instructions configured to enable a computer device (which may be a personal computer, a server, a network device or the like) or a processor to execute part of the steps of the method in each embodiment of the disclosure. The storage medium includes: various media capable of storing program codes such as a U disk, a mobile hard disk, a Read-Only Memory (ROM), a Random Access Memory (RAM), a magnetic disk or an optical disk.

The above is only the preferred embodiment of the disclosure and not intended to limit the disclosure. Any modifications, equivalent replacements, improvements and the like made within the spirit and principle of the disclosure shall fall within the scope of protection of the disclosure.

What is claimed is:

1. An uplink pre-coding method, comprising:
   acquiring, by a network-side device, a sounding reference signal (SRS) transmitted by a terminal device on at least one SRS resource;
   sending, by the network-side device, downlink control information (DCI) for scheduling uplink data transmission to the terminal device, wherein the DCI comprises an SRS resource indication (SRI), and the DCI does not comprise information for indicating a pre-coding matrix for the uplink data and does not comprise indication information of a transmission layer number, the SRI is configured to indicate one or more target SRS resources in the at least one SRS resource, and the SRI is used for the terminal device to determine a pre-coding scheme for uplink data according to the at least one SRS resource and the SRI and to pre-code the uplink data according to the pre-coding scheme, wherein each of the one or more target SRS resource corresponds to an uplink transmission layer; and
   receiving, by the network-side device, the pre-coded uplink data from the terminal device.

2. The method of claim 1, further comprising:
   sending, by the network-side device, a downlink signal, to enable the terminal device to determine a beam for transmitting the SRS according to downlink channel information obtained from the downlink signal.

3. A network-side device, comprising:
a processor; and
a storage medium, including a plurality of instructions configured to enable the processor to execute actions comprising:
acquiring a sounding reference signal (SRS) transmitted by a terminal device on at least one SRS resource;
sending downlink control information (DCI) for scheduling uplink data transmission to the terminal device, wherein the DCI comprises an SRS resource indication (SRI), and the DCI does not comprise information for indicating a pre-coding matrix for the uplink data and does not comprise indication information of a transmission layer number, the SRI is configured to indicate one or more target SRS resources in the at least one SRS resource; and
the SRI is used for the terminal device to determine a pre-coding scheme for uplink data according to the at least one SRS resource and the SRI and to pre-code the uplink data according to the pre-coding scheme, wherein each of the one or more target SRS resource corresponds to an uplink transmission layer; and
receiving the pre-coded uplink data sent by the terminal device.

4. The network-side device of claim 3, the actions further comprising:
sending a downlink signal, to enable the terminal device to determine a beam for transmitting the SRS according to downlink channel information obtained from the downlink signal.

5. The network-side device of claim 3, wherein a number of the one or more target SRS resources is the transmission layer number.

6. The network-side device of claim 3, wherein each of the at least one SRS resource adopts a single antenna port.

7. The network-side device of claim 3, the SRI is configured to indicate the one or more target SRS resources in the at least one SRS resource according to a correspondence relationship between SRIs and target SRS resources.

8. The network-side device of claim 3, wherein a rank value is equal to a number of the one or more target SRS resources, when the at least one SRS resource comprises four SRS resources: an index of the one or more target SRS resources indicated by the SRI is one of {0}, {1}, {2}, {3}, when the number of the one or more target SRS resources is 1; indexes of the one or more target SRS resources indicated by the SRI are one of {0,1}, {0,2}, {0,3}, {1,2}, {1,3}, {2,3}, when the number of the target SRS resources is 2; the indexes of the one or more target SRS resources indicated by the SRI are one of {0,1,2}, {0,1,3}, {0,2,3}, {1,2,3}, when the number of the one or more target SRS resources is 3; the indexes of the one or more target SRS resources indicated by the SRI are {0,1,2,3}, when the number of the one or more target SRS resources is 4.

9. The method of claim 1, wherein a number of the one or more target SRS resources is the transmission layer number.

10. The method of claim 1, wherein each of the at least one SRS resource adopts a single antenna port.

11. The method of claim 1, the SRI is configured to indicate the one or more target SRS resources in the at least one SRS resource according to a correspondence relationship between SRIs and target SRS resources.

12. The method of claim 1, wherein a rank value is equal to a number of the one or more target SRS resources, when the at least one SRS resource comprises four SRS resources: an index of the one or more target SRS resources indicated by the SRI is one of {0}, {1}, {2}, {3}, when the number of the one or more target SRS resources is 1; indexes of the one or more target SRS resources indicated by the SRI are one of {0,1}, {0,2}, {0,3}, {1,2}, {1,3}, {2,3}, when the number of the one or more target SRS resources is 2; the indexes of the one or more target SRS resources indicated by the SRI are one of {0,1,2}, {0,1,3}, {0,2,3}, {1,2,3}, when the number of the one or more target SRS resources is 3; the indexes of the one or more target SRS resources indicated by the SRI are {0,1,2,3}, when the number of the one or more target SRS resources is 4.

13. A terminal device, comprising:
a processor; and
a storage medium, comprising a plurality of instructions configured to enable the processor to execute actions comprising:
transmitting a sounding reference signal (SRS) on at least one SRS resource to a network-side device;
receiving downlink control information (DCI) for scheduling uplink data transmission from the network-side device, wherein the DCI comprises an SRS resource indication (SRI), and the DCI does not comprise information for indicating a pre-coding matrix for the uplink data and does not comprise indication information of a transmission layer number, the SRI is configured to indicate one or more target SRS resources in the at least one SRS resource,
determining a pre-coding scheme for uplink data according to the at least one SRS resource and the SRI;
preforming the pre-coding scheme for uplink data, wherein each of the one or more target SRS resources corresponds to an uplink transmission layer;
transmitting the pre-coded uplink data to the network-side device.

14. The terminal device of claim 13, the actions further comprising:
receiving a downlink signal from the network-side device and determining a beam for transmitting the SRS according to downlink channel information obtained from the downlink signal.

15. The terminal device of claim 13, wherein a number of the one or more target SRS resources is the transmission layer number.

16. The terminal device of claim 13, wherein each of the at least one SRS resource adopts a single antenna port.

17. The terminal device of claim 13, the SRI is configured to indicate the one or more target SRS resources in the at least one SRS resource according to a correspondence relationship between SRIs and target SRS resources.

18. The terminal device of claim 13, wherein a rank value is equal to a number of the one or more target SRS resources, when the at least one SRS resource comprises four SRS resources: an index of the one or more target SRS resources indicated by the SRI is one of {0}, {1}, {2}, {3}, when the number of the one or more target SRS resources is 1; indexes of the one or more target SRS resources indicated by the SRI are one of {0,1}, {0,2}, {0,3}, {1,2}, {1,3}, {2,3}, when the number of the one or more target SRS resources is 2; the indexes of the one or more target SRS resources indicated by the SRI are one of {0,1,2}, {0,1,3}, {0,2,3}, {1,2,3}, when the number of the one or more target SRS resources is 3; the indexes of the one or more target SRS resources indicated by the SRI are {0,1,2,3}, when the number of the one or more target SRS resources is 4.

* * * * *